US012071285B2

(12) United States Patent
Ames

(10) Patent No.: US 12,071,285 B2
(45) Date of Patent: Aug. 27, 2024

(54) FOOD JAR AND METHODS OF MAKING AND USING SAME

(71) Applicant: Real Value LLC, Norman, OK (US)

(72) Inventor: Micah Ames, Oklahoma City, OK (US)

(73) Assignee: Real Value LLC, Moore, OK (US)

( * ) Notice: Subject to any disclaimer, the term of this patent is extended or adjusted under 35 U.S.C. 154(b) by 0 days.

(21) Appl. No.: 16/246,117

(22) Filed: Jan. 11, 2019

(65) Prior Publication Data
US 2020/0223603 A1    Jul. 16, 2020

(51) Int. Cl.
| | | |
|---|---|---|
| *B65D 51/20* | (2006.01) | |
| *A47J 47/02* | (2006.01) | |
| *B65B 31/04* | (2006.01) | |
| *B65D 43/02* | (2006.01) | |

(52) U.S. Cl.
CPC .............. *B65D 51/20* (2013.01); *A47J 47/02* (2013.01); *B65B 31/04* (2013.01); *B65D 43/0225* (2013.01)

(58) Field of Classification Search
CPC ...... B65D 51/20; B65D 43/0225; A47J 47/02; B65B 31/04
USPC ........ 220/200, 592.23, 592.27, 62.13, 366.1, 220/215, 231, 203.11, 203.13, 203.29, 220/203.27
See application file for complete search history.

(56) References Cited

U.S. PATENT DOCUMENTS

| | | | | |
|---|---|---|---|---|
| 1,672,904 | A * | 6/1928 | Randall .............. | B65D 81/3818 220/592.27 |
| 2,186,338 | A * | 1/1940 | Mills ........................ | B65D 7/22 220/288 |
| 4,351,451 | A * | 9/1982 | Chung .................. | A47J 41/028 215/12.1 |
| 5,390,809 | A * | 2/1995 | Lin ........................ | B65B 31/047 137/522 |
| 5,558,243 | A * | 9/1996 | Chu .................... | B65D 81/2038 215/228 |
| 5,597,086 | A * | 1/1997 | King-Shui .............. | A47J 41/02 220/23.87 |
| 5,611,376 | A * | 3/1997 | Chuang ................. | B65B 31/047 141/65 |
| 6,371,328 | B1* | 4/2002 | Yamada .............. | A47J 41/0077 220/592.2 |
| D620,357 | S | 7/2010 | Jewett et al. | |
| D648,177 | S | 11/2011 | Eyal | |
| D672,238 | S | 12/2012 | Aziz et al. | |
| D672,609 | S | 12/2012 | Aziz et al. | |
| D700,012 | S | 2/2014 | Hurley et al. | |
| D723,333 | S | 3/2015 | Lin | |
| D724,385 | S | 3/2015 | Hurley et al. | |

(Continued)

*Primary Examiner* — J. Gregory Pickett
*Assistant Examiner* — Niki M Eloshway
(74) *Attorney, Agent, or Firm* — Hall Estill Law Firm

(57) ABSTRACT

A food jar provides an individual the ability to transport food or drink. The food jar includes a container and a lid. The container has a closed bottom end, an open upper end, and a sidewall defining a receiving space for holding food or drink. The lid is removably connected to the container. The lid includes a stopper having a valve. The stopper is positioned in the open upper end of the container. The valve is configured in the stopper for removing air from the receiving space of the container through an outlet passage through the stopper and then through a channel between the threading of the lid and the container.

18 Claims, 5 Drawing Sheets

(56) References Cited

U.S. PATENT DOCUMENTS

| | | |
|---|---|---|
| D787,935 S | 5/2017 | Kaiser |
| D790,920 S | 7/2017 | Goodwin et al. |
| D791,579 S | 7/2017 | Goodwin et al. |
| D808,220 S | 1/2018 | Burns et al. |
| D809,920 S | 2/2018 | Maple |
| D810,504 S | 2/2018 | Goodwin et al. |
| D811,818 S | 3/2018 | Wu |
| D812,428 S | 3/2018 | Wu |
| D815,908 S | 4/2018 | Kauss et al. |
| D822,439 S | 7/2018 | Spivey et al. |
| 2004/0094554 A1* | 5/2004 | Grybush ............. A01D 34/001 220/366.1 |
| 2015/0136770 A1* | 5/2015 | Wang ................ F16K 15/147 220/203.22 |
| 2015/0197390 A1* | 7/2015 | Kurabe ............. A47J 41/0077 220/592.27 |
| 2015/0219230 A1* | 8/2015 | Muennich ............ A61M 39/24 220/203.24 |

\* cited by examiner

FOOD JAR AND METHODS OF MAKING AND USING SAME

FIELD OF THE INVENTION

The present invention relates generally to a food jar for use in keeping food or liquid warm or cold, and more particularly, but not by way of limitation, to an improved food jar and methods of making and using the food jar.

BACKGROUND OF THE INVENTION

Food containers are well known for storing and carrying food and drink items. When storing food, food containers are often left to sit for an extended period of time. This can cause a vacuum to form inside the vessel making it nearly impossible to remove the lid. The solution employed to solve this problem typically involves including a relief valve of some kind. There are many food jars on the market with relief valves, but all of them sacrifice the heat insulation inside the container for a relief valve. This sacrifice often leads to cold or lukewarm food or drink when the warm food or drink is left in the container for a period of time. Alternatively, if no relief valve is added to the lid of the container, the warm food or drink will stay warm inside the container. However, a vacuum will be created inside the container that makes it nearly impossible to remove the lid from the container. A need was identified to create a food jar with a lid which contains a relief valve that would function to reduce excess pressure within the food contain so that opening a container will be safe and easy without sacrificing heat retention so that warm food and drink items will stay warm when left for an extended period of time.

To this end, although food containers of the existing art are operable, further improvements are desirable and a need remains to provide a food jar and method of use whereby the food jar is constructed in such a manner that it will preserve heat insulation for food or drink and allow for an individual to carry such food or drink. It is to such a food jar, and method of making and using, that at least one embodiment of the present invention is directed.

DETAILED DESCRIPTION OF THE INVENTION

Figure 1:
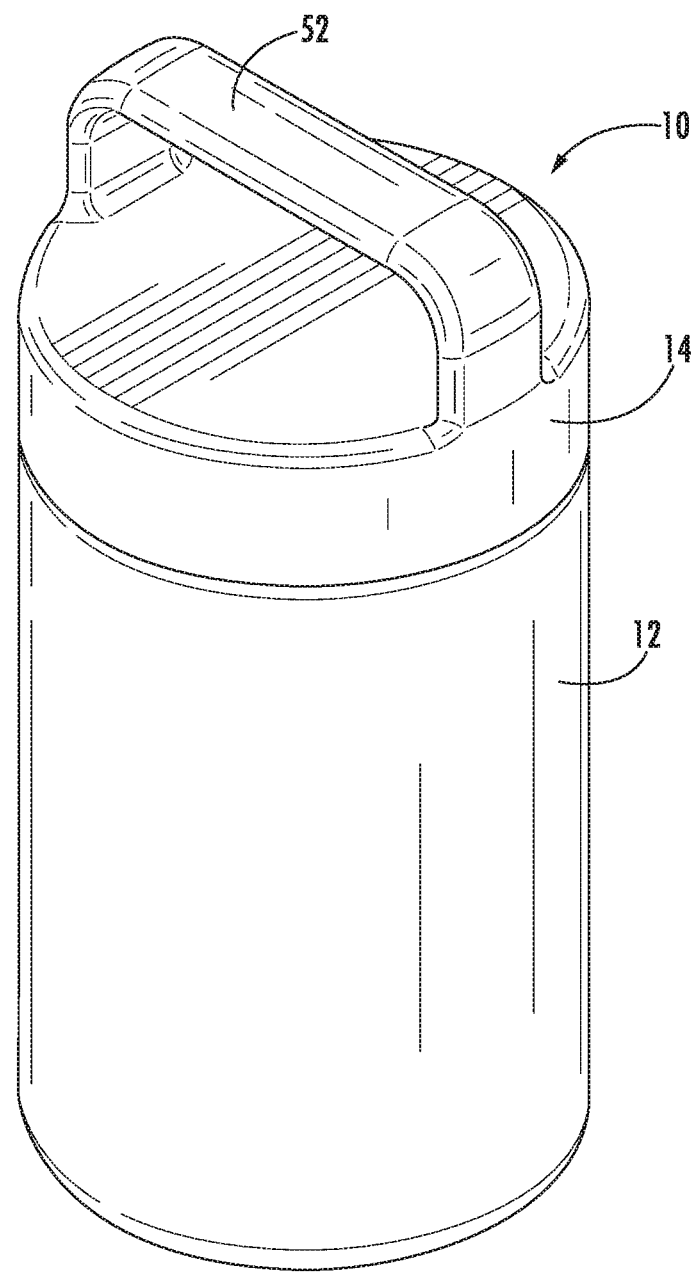
FIG. 1 is a perspective view of one embodiment of a food jar constructed in accordance with the present disclosure.
Figure 2:
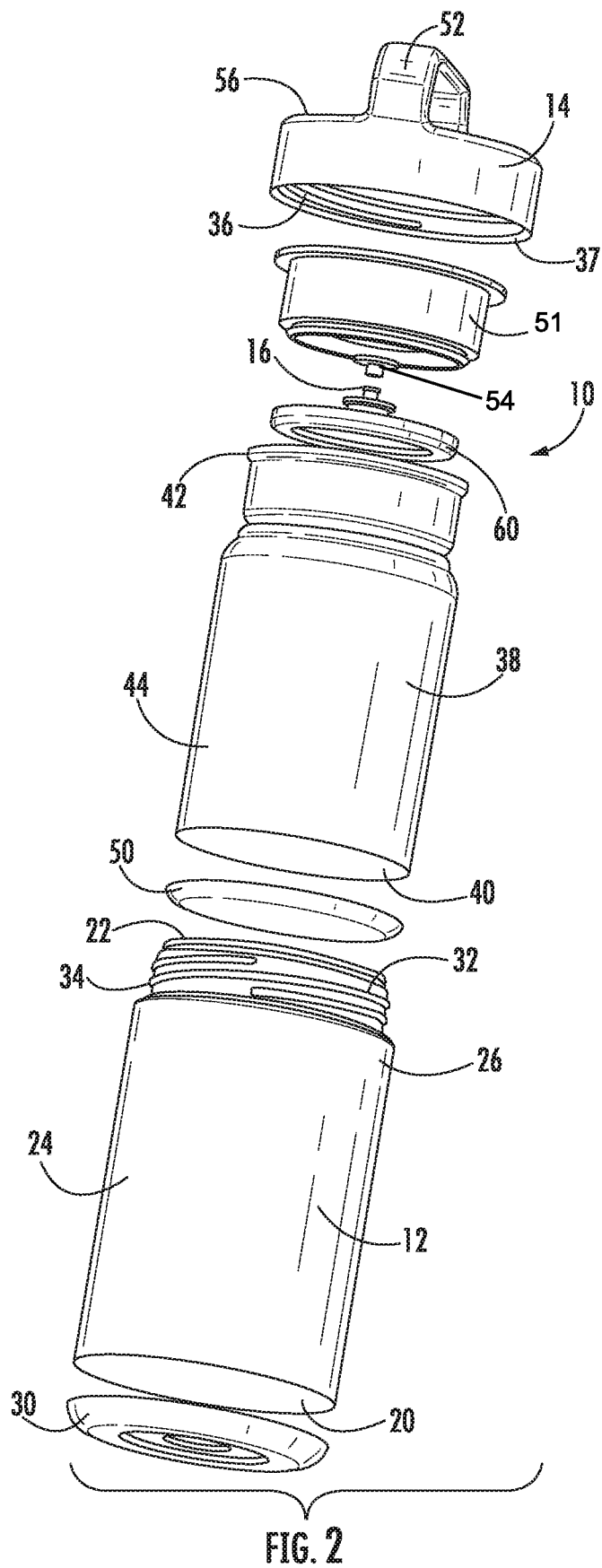
FIG. 2 is an exploded view of the food jar of FIG. 1.
Figure 3:
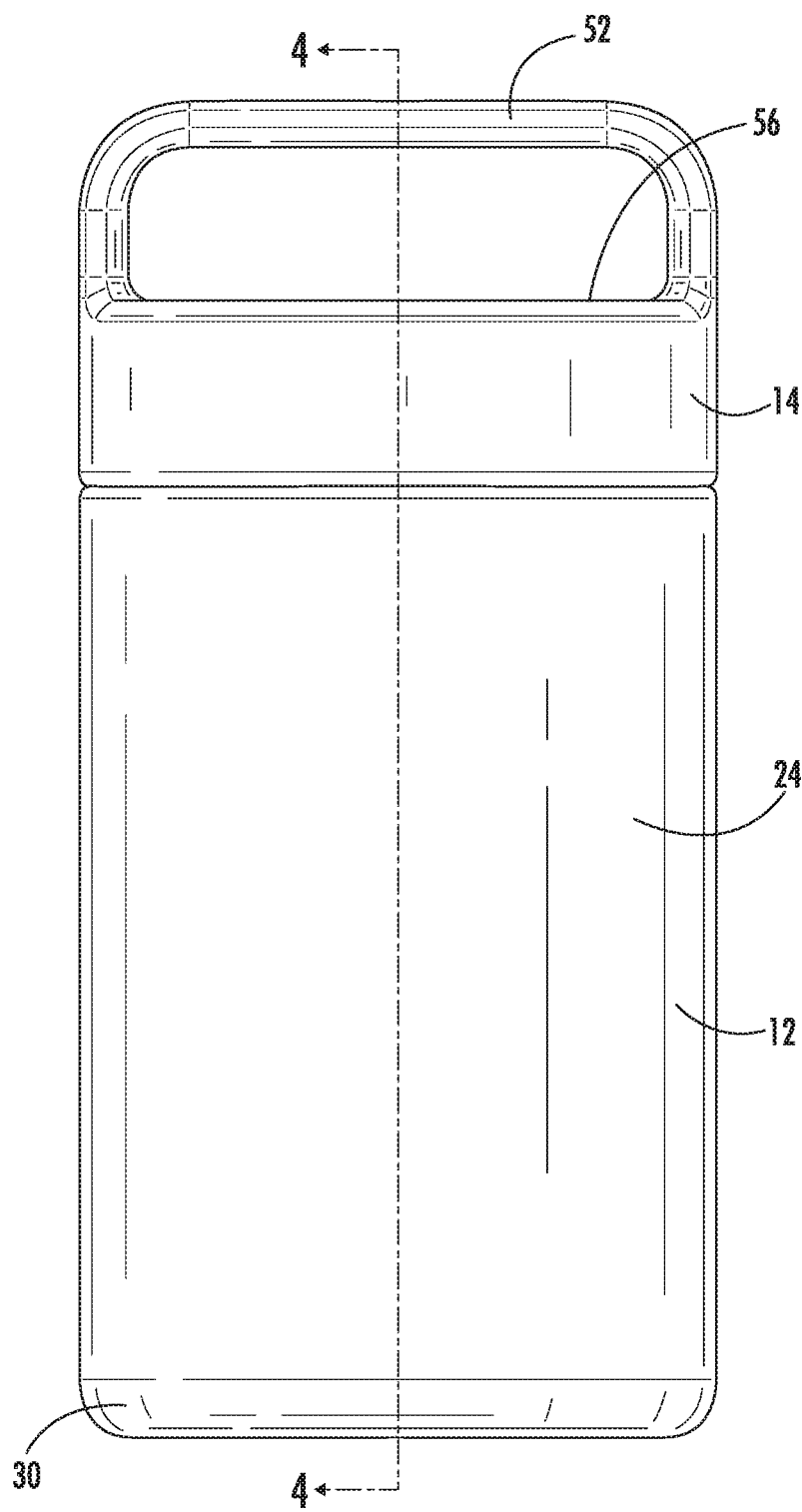
FIG. 3 is a side elevation view of the food jar of FIG. 1.
Figure 4:
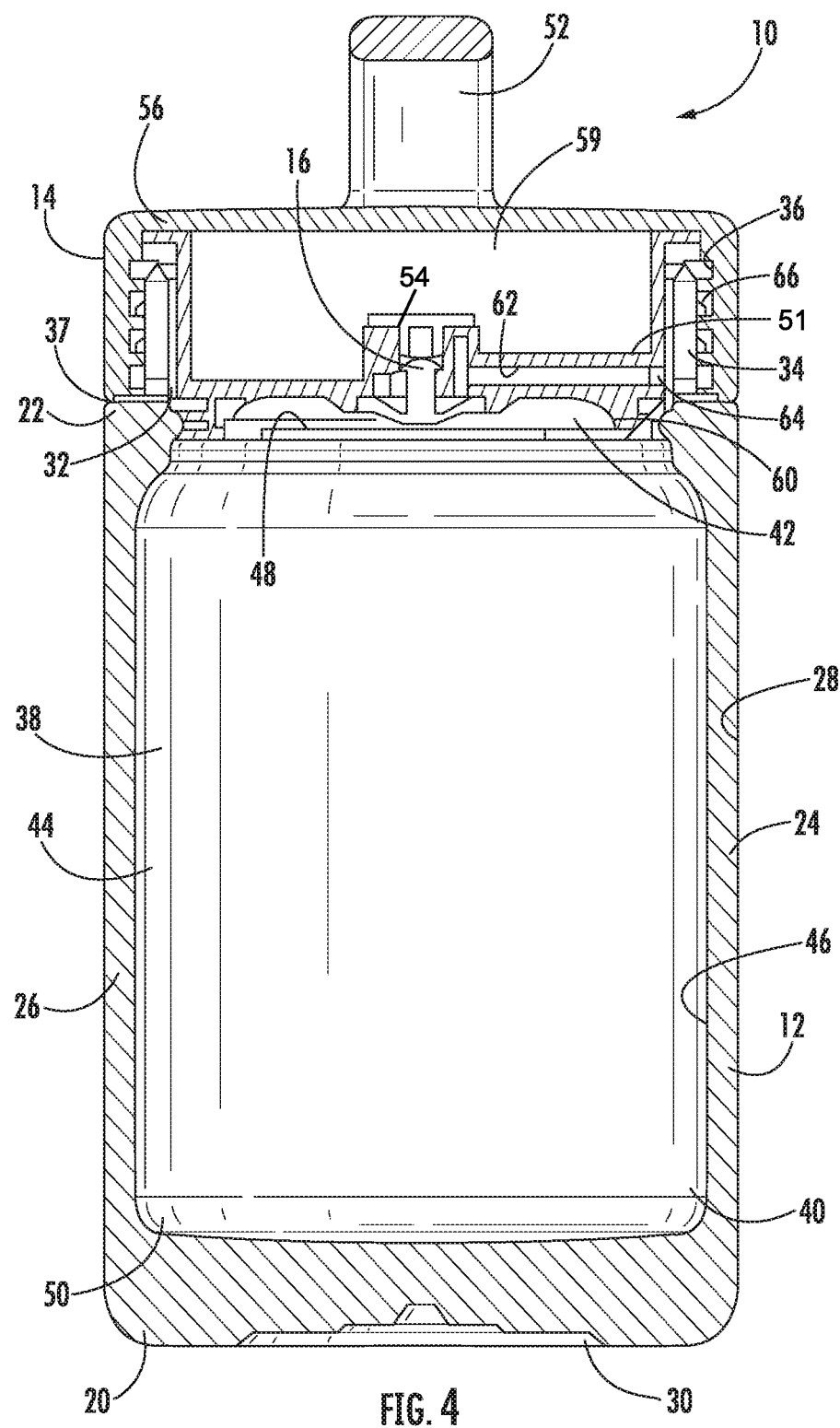
FIG. 4 is a cross-sectional view of the food jar of FIG. 3.

Referring now to the drawings, and more particularly to FIGS. 1, 3 and 4 one embodiment of a food jar 10 in an assembled condition is shown constructed in accordance with the present disclosure. The food jar 10 may be constructed from any material known by one of ordinary skill in the art which is strong and durable enough to support food and/or drink. The material may also be able to keep or help keep the food and/or drink hot or cold. It should be understood that the food jar 10 may be constructed from any material or combination of materials known by one of ordinary skill in the art used to construct/fabricate typical food jars, such as, for example, stainless steel, aluminum or other metallic or polymeric materials utilized or capable of being utilized in the construction of the food jar 10. Further, the food jar 10 may be any size and configuration to be utilized to store and carry various amount of food or drink. The food jar 10 is generally circular cylindrically shaped, however, it should be understood by one of ordinary skill in the art that the food jar 10 may be any variety of shapes, such as square, cylindrical, or the like, so long as the food jar 10 functions in accordance with the present disclosure as described herein. It is contemplated, in one embodiment, that portions of the food jar 10 are constructed as one piece, however, it should be understood that the food jar 10 may be constructed from various components, from multiple pieces of material, or from combinations thereof.

Referring to FIGS. 1-4, broadly, one embodiment of the food jar 10 includes a container 12 and a lid 14 having a valve 16. The container 12 has a closed bottom end 20, an upper open end 22 and a sidewall 24. In one embodiment, the upper open end 22 of the container 12 may be provided with a wider mouth opening than the typical container so as to accept and provide foods and/or liquids not typically accepted by narrow mouth containers.

The closed bottom end 20 and the sidewall 24 are formed by a shell body 26 of the container 12. The shell body 26 includes an insulating space 28. In another embodiment, the shell body 26 may be sized and configured to only insulate the sidewall 24 or the bottom end 20 separately. It should be understood that the insulating space 28 may contain a vacuum, partial vacuum, or an insulation substance or material, such as Styrofoam, foamed plastic, cotton, dry ice, a refrigerant, or any other heat insulation member. Though one embodiment of the container of the food jar is shown herein having an insulating space, it should be understood by one of ordinary skill in the art that other embodiments of the container of the food jar may be provided that are non-insulating.

The formation of a vacuum layer or inclusion of a heat insulation member in the insulating space 28 protects an internal and external gas exchange, reduces the energy loss caused by the heat exchange process, and thereby reduces the heat transfer time of the inner container 38 within the outer container 12.

In one embodiment, a heat insulation member may be selected as the heat insulating material because it has good insulation effect, which further improves the reduction of heat transfer time of the inner bottle body, and also because of its low cost and small quality, it will not significantly increase the weight of the food jar and can be easily filled into the insulation space.

The shell body 26 of the container 12 includes a bottom cover 30 affixed over the bottom end 20 of the shell body 26 of the container 12. The bottom cover 30 provides the container 12 with a stable base upon which the container 12 may rest on a flat surface. The bottom cover 30 may be removable or may be permanently affixed to the container 12.

The shell body 26 of the container 12 has a collar 32 connected to a portion of the sidewall 24 and extending upward therefrom. Threads 34 are formed near the upper open end 22 on the collar 32 of the shell body 26 of the container 12 so as to mate with complimentary threads 36 formed on an inner or bottom surface 37 of the lid 14 to facilitate the connection of the lid 14 and the container 12. Though threads are discussed herein being used to connect the lid 14 and the outer container 12, it should be understood by one of ordinary skill in the art that any connecting member or method of connecting one object to another may be utilized for connecting the lid 14 and the outer container 12.

One function of the shell body 26 of the container 12 is to enclose the food or liquid in an inner container 38. Additionally, the shell body 26 of the container 12 protects the inner container 38 and avoids any damage to the inner container 38 from collision during the carrying and transferring of the inner container 38. Also, the shell body 26 of the container 12 plays a role in insulating the inside and outside gas exchange, thereby improving the holding time of food or liquid in the inner container 38.

The inner container 38 has a closed bottom end 40, an upper open end 42 and a sidewall 44 defining a receiving space 46 for receiving food or liquid. The inner container 38 includes a bottom cover 50 affixed over the bottom end 40 of the inner container 38.

Figure 5:
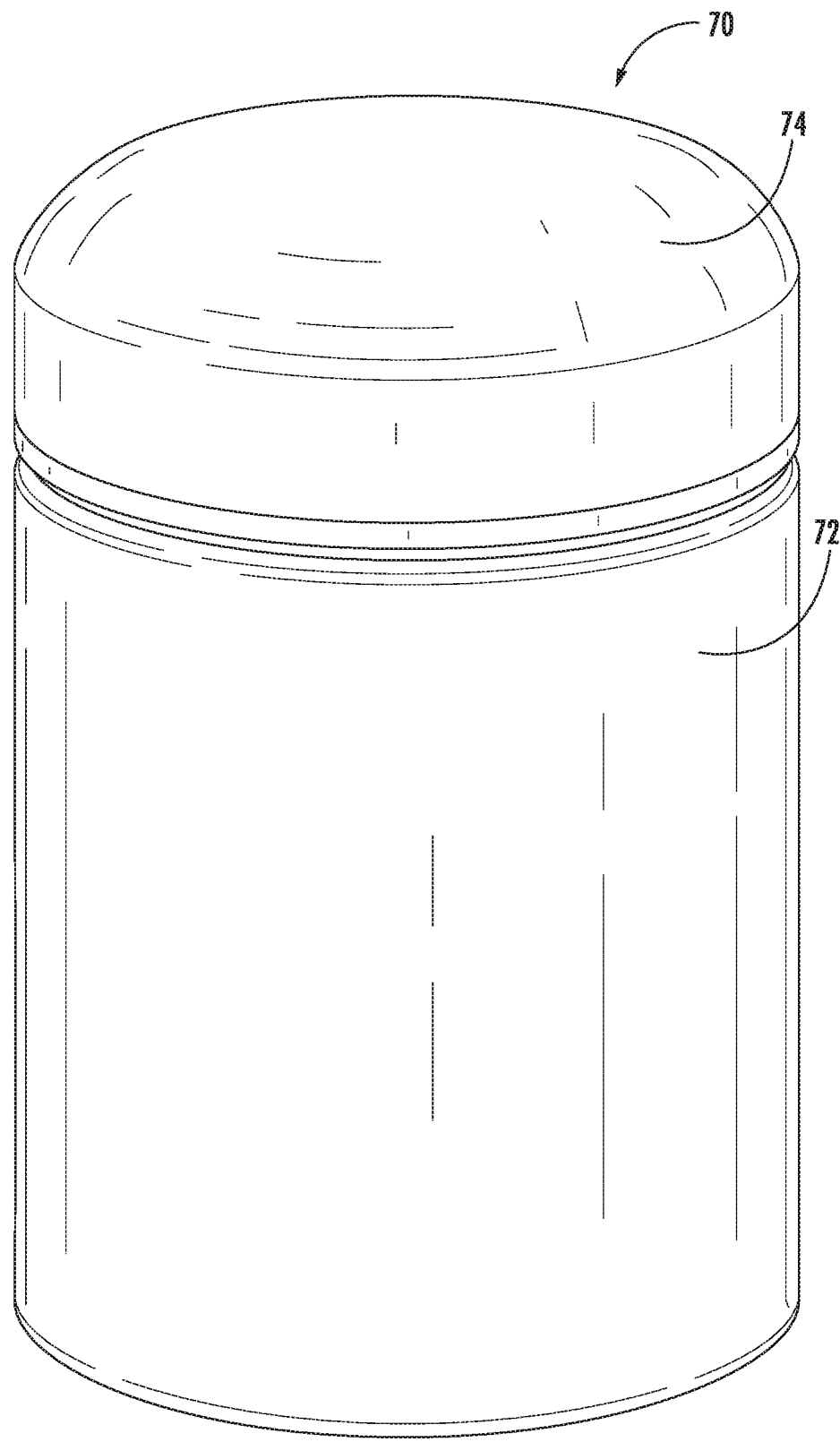
FIG. 5 is a perspective view of another embodiment of a food jar constructed in accordance with the present disclosure.

The lid 14 includes an inner portion 51, a handle 52 and a stopper 54. The inner portion 51 of the lid 14 is positioned within the lid 14 so as to extend in a direction away from the top surface 56 of the lid 14. The inner portion 51 may be formed as part of the lid 14 or as a separate portion to be inserted into the lid 14. The substantially u-shaped handle 52 is positioned on opposite sides about a portion of a top surface 56 of the lid 14. It should be understood by one of ordinary skill in the art that any shaped and sized handle may be utilized for carrying the food jar 10 so long as the handle 52 functions in accordance with the present disclosure. Additionally, although the presented embodiment depicts a lid with a handle, it should be understood by one of ordinary skill in the art that a food jar may be created with a lid of a variety of sizes and shapes, with or without a handle. For example, another embodiment of a food jar 70 is shown in FIG. 5. The food jar 70 includes a container 72 and a lid 74. The food jar 70 is similar to the food jar 10 except that the lid 74 has no handle.

Referring to FIGS. 1-4, the stopper 54 extends downward from a portion within the inner portion 51 of the lid 14 to the bottom surface 37 of the lid 14. The stopper 54 is positioned in the upper open end 42 of the inner container 38 so as to cover the receiving space 46 and to prevent food or liquid from spilling from the receiving space 46 of the inner container 38.

The lid 14 is provided with an insulating space 59. It should be understood that the insulating space 59 may contain a vacuum, partial vacuum, or an insulation substance or material, such as Styrofoam, foamed plastic, cotton, dry ice, a refrigerant, or any other heat insulation member. Though one embodiment of the lid of the food jar is shown herein having an insulating space, it should be understood by one of ordinary skill in the art that other embodiments of the lid of the food jar may be provided that are non-insulating.

At least one sealing ring 60 is positioned about a portion of the upper open end 42 of the inner container 38 so as to provide a seal between the upper open end 42 and the stopper 54 of the lid 14 to prevent leakage of the food or liquid from the receiving space 46 of the inner container 38. The at least one sealing ring 60 is arranged at the bottom of the valve 16 to cooperate with a portion of the stopper 54 to seal the receiving space 46, further functioning to isolate an inner and outer gas exchange and reduce heat transfer. The energy loss caused by the process can further increase the holding time of the inner container 38, and achieve the purpose of maintaining the temperature of the food or liquid for a longer time.

As the lid 14 is threadingly engaged to the container 12, the inner, lower surface of the lid 14 presses against the collar 32 of the shell body 26 to press the stopper 54 into the upper open end 42 of the inner container 38 and against an internal surface 48 of the sidewall 44 of the inner container 38. The stopper 54 seals the inner container 38 to a closed position. The stopper 54 and the sealing ring 60 cooperate to seal against the internal surface 48 of the sidewall 44 of the inner container 38.

The valve 16 is a round air cock type valve disposed in the stopper 54 of the lid 14. The valve 16 is shaped to connect to the stopper 54 by a vertical piece extending upwards from the round portion of the valve towards the handle. The vertical connecting piece is under tension towards the handle to connect the valve to the stopper 54 to seal the receiving space 46 to ensure the vessel does not leak through the stopper 54. The stopper 54 of the lid 14 is provided with an air outlet passage 62 in fluid communication with an air outlet 64. A channel 66 is disposed between the threads 34 and the threads 36 when the lid 14 is threadingly connected to the container 12.

The valve 16 is arranged in the stopper 54 of the lid 16 for cooperating with the air outlet 64. When the air pressure in the receiving space 46 is higher than the outside air pressure, the valve 16 moves downward under the action of internal pressure to allow pressure to move out of the receiving space 46. Air moves from the receiving space 46 through the air outlet passage 62 and out the air outlet 64. The air moves about the collar 32 through the channel 66 provided between the connected threads 34 and 36 thereby balancing the inner and outer air pressures and allowing the user to more easily open the lid 14.

In use, food or liquid is placed in the receiving space 46 the inner container 38. The stopper 54 of the lid 14 is positioned in the upper open end 42 of the inner container 38. The lid 14 is connected to the shell body 26 of the container 12 with the threads 36 and 34, respectively. When the individual is ready to eat or drink the food item, the lid 14 is threadingly removed from the container 12 so that an individual may access the food or drink item in the receiving space 46.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

What is claimed is:

1. A food jar for keeping both food or liquid warm or cold, comprising:
   a container having a closed bottom end, an open upper end, an insulating space and a sidewall defining a receiving space for holding food or drink; and
   a lid connected to the container in a completely sealed, closed position, the lid comprising:
      a stopper positioned in the open upper end of the lid, the stopper further comprising:
         an elongated, horizontal air outlet passage; and
         an air outlet configured in the stopper such that the air outlet is in fluid communication with the air outlet passage and the receiving space of the container; and a relief valve for reducing excess pressure in the receiving space of the container, the relief valve disposed in the stopper of the lid in a closed position wherein the relief valve is movable between an open position and the closed position such that when the relief valve is activated into the open position, air is removed from the receiving space of the container through the air outlet passage.

2. The food jar of claim 1 wherein the sidewall of the container is provided with an insulation space containing a vacuum, a partial vacuum or any heat insulation member.

3. The food jar of claim 1 wherein the stopper extends downward from a bottom surface of the lid and is positioned in the upper open end of the container so as to cover the receiving space and to prevent food or drink from spilling from the receiving space of the container.

4. The food jar of claim 1 wherein an inner surface of the lid is provided with threads and an outer surface of the container is provided with threads so that the lid and the container are connected to one another.

5. The food jar of claim 4 wherein a channel is disposed between the threads of the lid and the threads of the container when the lid is threadingly connected to the container.

6. The food jar of claim 5 wherein the channel is in fluid communication with the air outlet and the air outlet passage.

7. The food jar of claim 1 wherein the receiving space is in fluid communication with the channel when the valve is activated into an open position.

8. The food jar of claim 1 wherein the lid includes a handle.

9. The food jar of claim 8 wherein the handle is positioned on a top surface of the lid.

10. A food jar for keeping both food or liquid warm or cold, comprising:
- a container having a shell body positioned about an inner container, the shell body having a closed bottom end, an open upper end, a sidewall, and an insulating space, the inner container having a closed bottom end, an open upper end, and a sidewall defining a receiving space for holding food or drink;
- a lid connected to the container in a completely sealed, closed position, the lid comprising:
  - a stopper positioned in the open upper end of the lid, the stopper further comprising:
    - an elongated, horizontal air outlet passage; and
    - an air outlet configured in the stopper such that the air outlet is in fluid communication with the air outlet passage and the receiving space of the container; and
  - a relief valve for reducing excess pressure in the receiving space of the container, the relief valve disposed in the stopper of the lid in a closed position wherein the valve is movable between an open position and the closed position such that when the valve is activated into the open position, air is removed from the receiving space of the through the air outlet passage.

11. The food jar of claim 10 wherein the insulating space containing a vacuum, a partial vacuum or any heat insulation member.

12. The food jar of claim 10 wherein the stopper extends downward from a bottom surface of the lid and is positioned in the upper open end of the inner container so as to cover the receiving space and to prevent food or drink from spilling from the receiving space of the container.

13. The food jar of claim 10 wherein an inner surface of the lid is provided with threads and an outer surface of the shell body is provided with threads so that the lid and the shell body of the container are connected to one another.

14. The food jar of claim 13 wherein a channel is disposed between the threads of the lid and the threads of the shell body of the container when the lid is threadingly connected to the container.

15. The food jar of claim 14 wherein the channel is in fluid communication with the air outlet and the air outlet passage.

16. The food jar of claim 15 wherein the receiving space is in fluid communication with the channel when the valve is activated into an open position.

17. The food jar of claim 10 wherein the lid includes a handle.

18. The food jar of claim 17 wherein the handle is positioned on a top surface of the lid.

* * * * *